3,804,903
PROCESS FOR PRODUCTION OF
METHACROLEIN
Katsuo Hagiwara, Yokohama, Japan, assignor to the
Japanese Gun Company, Ltd., Tokyo, Japan
No Drawing. Filed July 31, 1970, Ser. No. 60,084
Int. Cl. C07c 45/04
U.S. Cl. 260—604 R     6 Claims

ABSTRACT OF THE DISCLOSURE

A process for the production of methacrolein which comprises subjecting to a vapor phase catalytic reaction a gaseous mixture containing isobutene and molecular oxygen at an elevated temperature in the presence of catalyst consisting essentially of (1) molybdenum, (2) bismuth, (3) iron, (4) silver and (5) oxygen.

---

This invention relates to a process for the production of methacrolein by the catalytic oxidation of isobutene; more particularly to a process for the production of methacrolein by subjecting a gaseous mixture of isobutene and molecular oxygen to a vapor phase catalytic reaction at an elevated temperature in the presence of (1) molybdenum, (2) bismuth, (3) iron, (4) silver and (5) oxygen.

Many processes and catalysts have been proposed for the oxidation useful in the unsaturated aldehyde synthesis reaction, but most of the processes are for preparing acrolein by the oxidation of propylene and there is almost no concrete disclosure of a process for the production of methacrolein by the oxidation of isobutene. Even these very few working examples have low industrial signifiicance, because as shown later in the examples both the yields and selectivity of methacrolein are very low or the life of catalyst is short. It is well known that though propylene and isobutene are compounds of similar structure, the oxidation reaction of isobutene is much more difficult than that of propylene. Therefore it is very seldom that even catalysts showing comparatively better results as catalysts in the reaction from propylene to acrolein actually show results good enough to use them commercially as catalyst in the reaction from isobutene to methacrolein.

Though the vapor phase oxidation reaction from propylene to acrolein is being conducted industrially, there is no example of commercial production of methacrolein from isobutene. In short, it is almost impossible to find catalyst in oxidation of isobutene actually usable in view of industrial and economic standpoint, and the effect of a catalyst cannot be confirmed until it is justified by experiment.

As previously noted, the vapor phase oxidation of isobutene to methacrolein is difficult and it is hard to obtain satisfactory yields and selectivity. Also, the reaction is accompanied by the generation of a great amount of heat (particularly generation of heat point), thereby making adjustment of the reaction extremely difficult. As means to avoid such disadvantages, there is a method in which the concentration of isobutene in the reaction gas is extremely lowered, but this is undesired because the productivity of the process is eventually declined. Therefore, in order that the vapor phase oxidation reaction from isobutene to methacrolein may be industrially possible, a catalyst having high yields and selectivity without abnormal heat generation, capable of stabilizing the reaction and having a long life is demanded.

Accordingly, it is the object of the present invention to make possible the commercial production of methacrolein from isobutene by finding a catalyst to meet such demand. Another object of the present invention will become clear by the description below.

The object of the present invention can be attained with the use of catalyst comprising (1) molybdenum, (2) bismuth, (3) iron, (4) silver and (5) oxygen, that is, a catalyst of the following formula

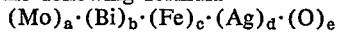

wherein $a$, $b$, $c$, $d$ and $e$ each represent a desirable number of atoms of each element; $a:b:c:d$ is in the range of 1:0.1 to 3:0.05 to 3:0.01 to 1; and $e$ is the number of oxygen atoms sufficient to satisfy the atomic valences of Mo, Bi, Fe and Ag.

With this catalyst methacrolein is obtained with high yields, which are unobtainable with other catalysts. So far in the production of methacrolein from isobutene with a catalyst proposed for the production of unsaturated aldehydes, e.g. with a molybdenum-bismuth catalyst, the yield of methacrolein is 49.7% at a reaction temperature of 488° C., and with molybdenum-bismuth-iron catalyst the yield is 44.6% at a reaction temperature of 464° C. On the other hand, with the catalyst of the present invention of molybdenum, bismuth, iron and silver, the yield is as high as 60.4% at a reaction temperature of 435° C. Further the reaction is very stable. With the catalyst of the present invention, much higher conversions and yields (selectivity is also satisfactorily high) than those obtained by conventional catalysts are obtainable advantageously at a temperature 50–100° C. lower than those required with conventional catalysts obtain best results.

In the present invention as the starting raw material gas, a mixture of isobutene and oxygen (industrially air is more advantageous) is used. Gases not effecting the reaction such as stream, nitrogen, carbon dioxide, helium, argon, saturated hydrocarbon (e.g. methane, ethane, propane, butane, pentane, etc.) may be introduced as a diluent together with the mixed gas into the reaction system.

The concentration of isobutene in the raw material gas is preferably 1 to 25% by volume and the molar ratio of isobutene to oxygen is appropriately within the range of 1:0.1 to 5.0.

As described above, the catalyst used in the process of the present invention comprises molybdenum, bismuth, iron, silver and oxygen, as mentioned above. It may further contain small amounts of boron and silicon as auxiliary ingredients.

The method of preparing the catalyst has no such significance as to limit the effect of the present invention. It can be prepared by an oxide mixing method, evaporation to dryness method, coprecipitation method, etc. That is, each component of the starting material is not necessarily in the state of an oxide and if it can be finally changed into its corresponding metallic oxide by calcination, whether it is the metal itself, metallic salt, acid, or base does not matter. Examples of such starting materials are molybdic acid, ammonium molybdate, phosphorus molybdic acid, silicomolybdic acid, bismuth nitrate, bismuth hydroxide, iron nitrate, iron chloride, iron hydroxide, silver nitrate, silver chloride, etc. In the evaporation to dryness method, the molybdenum-bismuth-iron-silver-oxygencatalyst is prepared by mixing predetermined amounts of a solution prepared by dissolving ammonium molybdate in ammonia water, a solution prepared by dissolving bismuth nitrate in an aqueous solution of nitric acid, an aqueous solution of ferric nitrate and an aqueous solution of silver nitrate with agitating, evaporating the solution to dryness, followed by calcination of the dried mixture. The oxide mixing method will be described later in an example. It is desirable that the catalyst should be calcined at 350 to 750° C., preferably 450 to 650° C. for a period of several hours to several tens of hours prior to use. Further, the state of each constituent element in the catalyst is not clear and it is not known whether the elements are present just in the mixed state of oxides or they are bonded to one another directly or through oxygen.

The catalyst can be used as it is, in the mold or powder, or in the form diluted with a diluent. The catalyst can also be deposited on a suitable carrier. The diluents or carriers include alumina, silicon carbide, titanium dioxide, zirconium oxide, thorium chloride, pumice, silica gel cellite, etc., which are inert to the reaction. The amount of diluents or carriers to be used does not substantially acect the activity of the catalyst and may conveniently be selected.

In practicing the present invention, the reaction temperature is 300 to 600° C., preferably 350 to 500° C. The contact time (on the basis of 0° C. and 1 atm.) is 0.01 to 30 sec., preferably 0.1 to 15 sec. The reaction pressure ranges from reduced pressure below atmospheric pressure to 20 kg./cm.$^2$, preferably from atmospheric pressure to 5 kg./cm.$^2$.

A reaction apparatus in practicing the present invention may be of any known type such as a fluidized bed, moving bed, fixed bed, etc. and methacrolein can be recovered from the reaction product by known methods such as the condensation method or extraction method with water or a proper solvent.

Non-limitative embodiments of the present invention will be described below. The conversion of isobutene, the yield and selectivity of methacrolein formed are defined below.

Conversion (percent) =

$$\frac{\text{Supplied isobutene (mol)} - \text{Unreacted isobutene (mole)}}{\text{Supplied isobutene (mole)}} \times 100$$

$$\text{Yield (percent)} = \frac{\text{Methacrolein formed (mole)}}{\text{Supplied isobutene (mole)}} \times 100$$

$$\text{Selectivity (percent)} = \frac{\text{Yield}}{\text{Conversion}} \times 100$$

All the analyses are made with a gas chromatograph.

EXAMPLE (1) Preparation of catalyst (A) Mo-Bi-Fe-Ag-O catalyst.—72 g. of molybdenum trioxide, 117 g. of bismuth oxide, 13 g. of ferric oxide and 62 g. of silver oxide were thoroughly mixed in 60 ml. of water. The resulting mixture was calcined in the air for 2 hr. and then pulverized. A small amount of graphite was mixed, and the mixture was shaped into tablets 5 mm. in diameter and 5 mm. in length with a tablet machine. They were calcined in the air at 550° C. 16 hr. This is referred to as catalyst A-1 hereinafter. In catalyst A-1, the atomic ratio of its constituent metallic elements, Mo:Bi:Fe:Ag, is 1:1:0.3:0.1. Then catalyst A-2 showing a composition as given in Table 1 was similarly prepared.

(B) Mo-Bi-Fe-O catalyst.—72 g. of molybdenum trioxide, 117 g. of bismuth oxide and 13 g. of ferric oxide were thoroughly mixed in 60 ml. of water. The mixture was treated by the procedure in (A) to prepare catalyst B. The atomic ratio of the constituent metallic elements in catalyst B, Mo:Bi:Fe, is 1:1:0.3.

(C) Mo-Bi-O catalyst.—72 g. of molybdenum trioxide and 117 g. of bismuth oxide were thoroughly mixed in 60 ml. of water. The mixture was treated in the same way to prepare catalyst C. The atomic ratio of the constituent metallic elements in catalyst C, Mo:Bi, is 1:1.

(2) Procedure for reaction

Stainless reaction tubes, 25 mm. in inner diameter, 60 cm. in length were packed with 60 ml. of each catalyst so prepared and heated with molten metal to produce methacrolein by the oxidation of isobutene. The reaction temperature was the temperature of the metal bath which was maintained constant. The molar ratio of isobutene:oxygen:nitrogen:steam in the supplied gas is 1:2:8:6 in all cases. The contact time was 3.6 sec. (on the basis of 0° C. and 1 atm.). The results obtained are given in the table.

TABLE—COMPARISON OF CATALYST

| Catalyst (atomic ratio of metallic elements) | Temp. of metal bath (reaction temperature) ° C. | Percent Conversion | Yield selectivity |
|---|---|---|---|
| Embodiment of present invention | | | |
| A-1, Mo-Bi-Fe-Ag-O (1:1:0.3:0.1). | 386 | 65.0 | 46.7 (71.7) |
|  | 416 | 85.1 | 57.8 (67.9) |
|  | 435 | 92.7 | 60.4 (65.1) |
| A-2, Mo-Bi-Fe-Ag-O (1:1.6:0.3:0.1). | 378 | 78.6 | 52.3 (66.6) |
|  | 400 | 82.3 | 55.7 (67.6) |
|  | 415 | 85.1 | 57.7 (67.8) |
| Control | | | |
| B, Mo-Bi-Fe-O (1:1:0.3) | 440 | 48.2 | 33.9 (70.3) |
|  | 464 | 67.6 | 44.6 (66.0) |
| C, Mo-Bi-O (1:1) | 430 | 53.3 | 36.1 (67.6) |
|  | 460 | 62.8 | 46.8 (74.5) |
|  | 488 | 77.3 | 49.7 (64.2) |

(3) Discussion

As clearly seen in the table, it is found out that an extremely high conversion of isobutene at low temperatures is obtained in the present invention as compared with the control and methacrolein is obtained at very high yield with a satisfactory, high selectivity. Further, during the reaction excess heat was not generated and the reaction was very stable. By-products such as methacrylic acid, carbon monoxide, and carbon dioxide were in small amounts.

I claim:

1. A process for the production of methacrolein which comprises subjecting to a vapor phase catalytic reaction a gaseous mixture containing isobutene and molecular oxygen at a temperature of 300° to 600° C. in the presence of a catalyst consisting of (1) molybdenum, (2) bismuth, (3) iron, (4) silver and (5) oxygen in an atomic ratio of (1):(2):(3):(4) of 1 to 3:0.05 to 3:0.01 to 1.

2. The process of claim 1 wherein the concentration of isobutene in the gaseous mixture is 1 to 25% by volume.

3. The process of claim 1 wherein the molar ratio of isobutene to molecular oxygen in the gaseous mixture is 1:0.1 to 5.0.

4. A process for the production of methacrolein which comprises subjecting to a vapor phase catalytic reaction a gaseous mixture containing isobutene and molecular oxygen at the molar ratio of 1:0.1 to 5.0 and having an isobutene concentration of 1 to 25% by volume in the presence of catalyst consisting of molybdenum, bismuth, iron, silver and oxygen and having the atomic ratio of constituent metallic elements, Mo:Bi:Fe:Ag, of 1:0.1 to 3:0.05 to 3:0.01 to 1 at a temperature of 300 to 600° C.

5. The process of claim 1 wherein said catalyst is supported on an inert carrier.

6. The process of claim 4 wherein said catalyst is supported on an inert carrier.

References Cited

UNITED STATES PATENTS

| | | | |
|---|---|---|---|
| 3,522,299 | 7/1970 | Takenaka et al. | 260—604 R |
| 3,576,764 | 4/1971 | Yamaguchi et al. | 260—604 R |
| 3,271,459 | 9/1966 | Brill et al. | 260—604 R |
| 3,565,826 | 6/1968 | Semewald et al. | 260—604 R |

FOREIGN PATENTS

| | | | |
|---|---|---|---|
| 1,038,432 | 8/1966 | Great Britain | 260—604 R |
| 1,204,659 | 11/1965 | Germany | 260—604 R |

LEON ZITVER, Primary Examiner

R. H. LILES, Assistant Examiner

U.S. Cl. X.R.

252—456, 467; 260—533

UNITED STATES PATENT OFFICE
CERTIFICATE OF CORRECTION

Patent No. 3,804,903  Dated April 16, 1974

Inventor(s) Katsuo HAGIWARA

It is certified that error appears in the above-identified patent and that said Letters Patent are hereby corrected as shown below:

In the Heading, insert patentee's Foreign Filing Information as follows:

-- Claims priority, application Japan, August 6, 1969,

No. 44-61650/69. --

Signed and sealed this 3rd day of September 1974.

(SEAL)
Attest:

McCOY M. GIBSON, JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334